(12) United States Patent
Nakayama et al.

(10) Patent No.: US 11,424,513 B2
(45) Date of Patent: Aug. 23, 2022

(54) CONNECTION MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Osamu Nakayama, Yokkaichi (JP); Seishi Kimura, Yokkaichi (JP)

(73) Assignees: AUTONETWORKS TECHNOLOGIES, LTD., Yokkaichi (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 1101 days.

(21) Appl. No.: 16/063,761

(22) PCT Filed: Dec. 5, 2016

(86) PCT No.: PCT/JP2016/086022
§ 371 (c)(1),
(2) Date: Jun. 19, 2018

(87) PCT Pub. No.: WO2017/110433
PCT Pub. Date: Jun. 29, 2017

(65) Prior Publication Data
US 2020/0274129 A1    Aug. 27, 2020

(30) Foreign Application Priority Data

Dec. 24, 2015 (JP) .............................. JP2015-251220

(51) Int. Cl.
*H01M 50/502* (2021.01)
*H01R 9/22* (2006.01)

(52) U.S. Cl.
CPC .......... *H01M 50/502* (2021.01); *H01R 9/223* (2013.01); *H01M 2220/20* (2013.01)

(58) Field of Classification Search
CPC ........... H01M 50/502; H01M 2220/20; H01M 10/613; H01M 10/467; H01M 10/6556;
(Continued)

(56) References Cited

U.S. PATENT DOCUMENTS 8,632,905 B2 *  1/2014  Yasui .................... H01M 50/20
                                                   429/130
9,252,407 B2 *  2/2016  Kim ..................... H01M 10/613
(Continued)

FOREIGN PATENT DOCUMENTS

JP    2000223092 A    8/2000
JP    2008234936 A    10/2008
(Continued)

OTHER PUBLICATIONS

International Search Report and Written Opinion for Application No. PCT/JP2016/086022 dated Mar. 7, 2017; 6 pages.
(Continued)

*Primary Examiner* — Michael L Dignan
(74) *Attorney, Agent, or Firm* — Reising Ethington, P.C.

(57) ABSTRACT

A connection module attachable to a power storage element group formed by lining up a plurality of power storage elements is provided with a bus bar (connection member) that extends in a vertical direction and is connected to electrode terminals, an insulating protector having a holding portion that holds the bus bar, and a cover that covers the bus bar. The cover is provided with an intake port and an exhaust port positioned above the intake port, and a ventilation passage through which air can flow in the vertical direction is formed between the cover and the holding portion, the ventilation passage being in communication with the intake
(Continued)

port and the exhaust port, and the bus bar is arranged inside the ventilation passage.

3 Claims, 9 Drawing Sheets

(58) Field of Classification Search
CPC ........... H01M 10/6562; H01M 50/209; H01M 50/278; H01M 50/50; H01M 50/507; H01M 50/522; H01M 10/625; H01R 9/223; Y02E 60/10
See application file for complete search history.

(56) References Cited

U.S. PATENT DOCUMENTS

| | | | | |
|---|---|---|---|---|
| 2007/0031728 A1* | 2/2007 | Lee | ................... | H01M 10/6563 429/120 |
| 2009/0061305 A1* | 3/2009 | Nishida | ............... | H01M 10/643 429/164 |
| 2010/0255360 A1* | 10/2010 | Umemoto | ........... | H01M 10/615 429/158 |
| 2011/0318618 A1* | 12/2011 | Yajima | .............. | H01M 10/6554 429/72 |
| 2016/0111762 A1* | 4/2016 | Kawakami | ............ | H01M 50/20 429/83 |
| 2017/0077566 A1* | 3/2017 | Mascianica | ........... | H01M 50/20 |
| 2017/0222200 A1 | 8/2017 | Murai et al. | | |

FOREIGN PATENT DOCUMENTS

| | | |
|---|---|---|
| JP | 2009016076 A | 1/2009 |
| JP | 2012028228 A | 2/2012 |
| JP | WO2014192087 A | 12/2014 |

OTHER PUBLICATIONS

Office action issued by the German Patent Office for DE112016005977.9 dated Feb. 8, 2021; 6 pages.

* cited by examiner

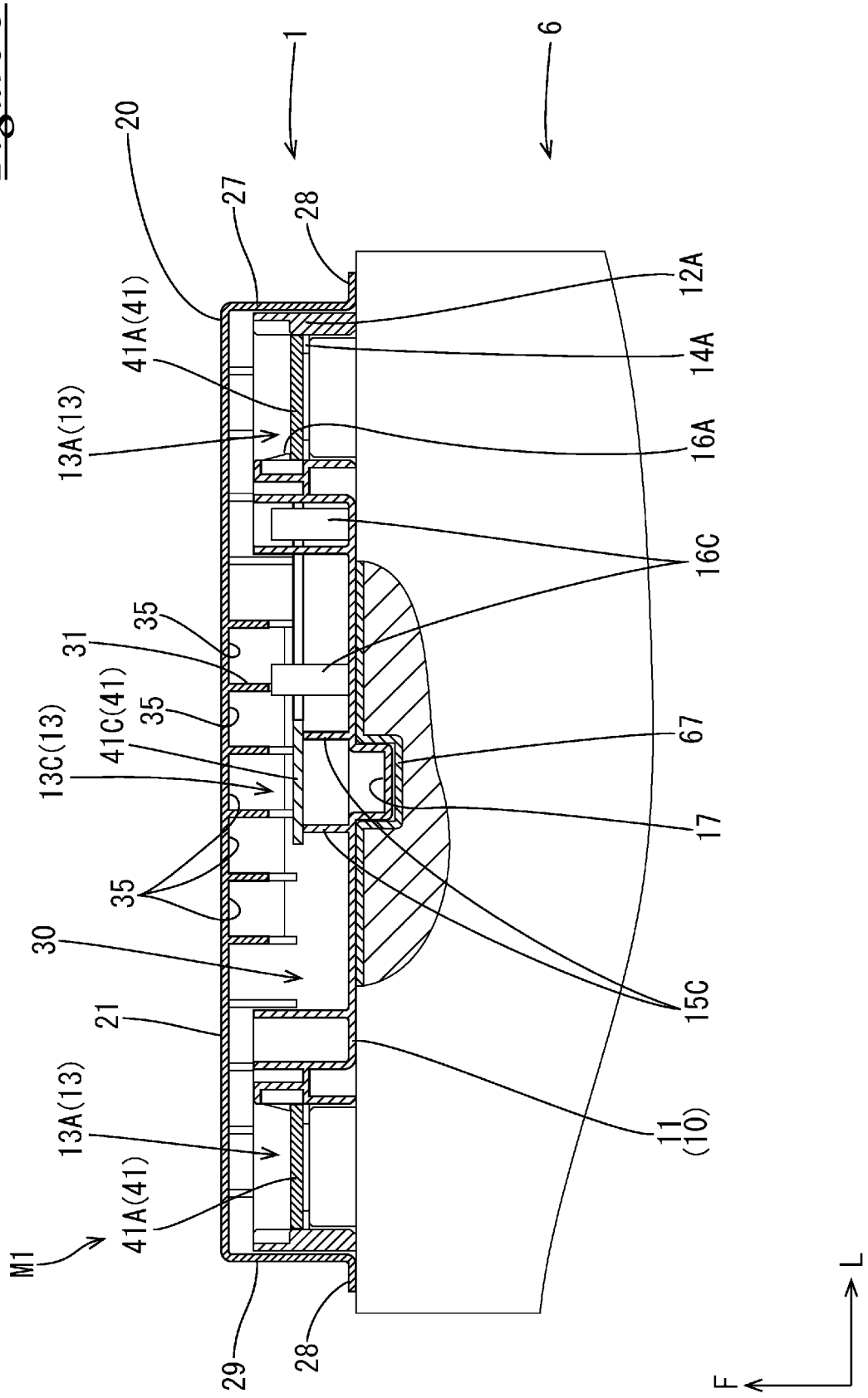

CONNECTION MODULE

CROSS REFERENCE TO RELATED APPLICATIONS

This application claims the priority of Japanese patent application JP2015-251220 filed on Dec. 24, 2015, the entire contents of which are incorporated herein.

TECHNICAL FIELD

The technology disclosed in the present specification relates to a connection module.

BACKGROUND ART

Conventionally, a power storage module provided with a power storage element group formed by lining up a number of power storage elements has been used as a power storage module exclusively for an electric vehicle or hybrid vehicle, in order to increase output. In such a power storage module, a connection module provided with an insulation protector that holds a connection member is attached to the power storage element group from a direction perpendicular to a direction in which the power storage elements are lined up, electrode terminals of adjacent power storage elements are connected to each other with the connection member, and thus a plurality of power storage elements are connected to each other. When such a power storage module is utilized, a large current flows in the connection members that connect the electrode terminals to each other, and thus an amount of heat Q generated by the connection member increases according to Joule's law that is expressed as follows:

$$Q = I^2 \times R \times t \quad \text{(Equation 1)}$$

In this Equation 1, Q denotes the amount of generated heat, I denotes the current, R denotes the electrical resistance, and t denotes the time. If the temperature of the power storage module becomes high due to a large amount of generated heat in this way, for example, there is a risk that the insulation protector made of resin will be thermally deformed, and a battery performance of the power storage elements will be adversely affected.

In view of this, as a technology for preventing the temperature of the power storage module from becoming high, for example, a technology as disclosed in the following Patent Document 1 (JP5776935B) has been proposed. In a battery connection module disclosed in Patent Document 1, heat, which is likely to be accumulated in a space between a connection module and a single battery group, is dissipated by providing a wall opposed to the single battery group in a step-wise manner in the protector, which is attachable to the single battery group and which holds the connection member, and forming a ventilation space between a second wall whose distance from the single battery group is larger than that of a first wall.

SUMMARY

Incidentally, in the case of a connection module provided with a cover arranged so as to cover a connection member for insulation and protection, heat is accumulated inside the cover where the connection member is arranged, and therefore the temperature inside the connection module tends to be high. For this reason, although measures have been taken such as performing blast cooling by arranging e.g. a blower, in some cases it is difficult to arrange the blower or the like, due to restrictions such as installation conditions, use conditions, and furthermore the costs. Therefore, there has been a demand for a technology for effectively dissipating heat inside the connection module by natural convection.

The technology disclosed in this specification has been conceived based on the above circumstances and aims to provide a connection module that can effectively dissipate heat inside a connection module with a simple structure.

A connection module disclosed in the present specification is a connection module that is attachable to a power storage element group formed by lining up a plurality of power storage elements that each have a positive and a negative electrode terminal, the connection module including: a connection member that extends in a vertical direction and is connected to one of the electrode terminals; and a cover that covers the connection member, the cover being attached to the power storage element group. The cover has an intake port and an exhaust port provided at a position above a position of the intake port, and a ventilation passage through which air can flow in the vertical direction and that is formed between the cover and the power storage element group, the ventilation passage being in communication with the intake port and the exhaust port, and the connection member being arranged inside the ventilation passage.

With the above configuration, by a very simple configuration in which an intake port and an exhaust port are provided in the cover, a ventilation passage in which air can flow in the vertical direction is formed inside the connection module. The connection member that generates heat is arranged inside this ventilation passage, and thus the heat inside the connection module can be efficiently dissipated due to the chimney effect. Specifically, air that flows into the connection module from the intake port provided in the cover is warmed by coming into contact with the connection member arranged inside the ventilation passage. The air whose density has been reduced by being warmed becomes lighter, goes up inside the ventilation path, and flows out from the exhaust port provided at a position above the intake port, that is, at a position higher than that of the intake port, of the cover. By doing this, the heat generated in the connection member can be efficiently dissipated to the outside of the connection module. Furthermore, a negative pressure is generated inside the ventilation passage due to an upward convection of the warmed air, and thus outside air easily flows into the connection module from the intake port, and therefore an efficiency of cooling the connection member is further increased.

In the connection module disclosed in the present specification, the ventilation passage may also be formed in the cover, and the ventilation passage may also be provided with a rib that protrudes toward the connection member and that extends from the intake port side to the exhaust port side. With this configuration, the rigidity of a portion of the cover that forms the ventilation passage is increased and the strength is improved, and also, by the rib that protrudes into the ventilation passage functioning as a straightening plate, the air flow inside the ventilation passage is straightened and the flowability of the air is improved, and thus heat can be dissipated more efficiently.

Furthermore, in the connection module disclosed in the present specification, the ventilation passage may also be formed along the vertical direction. With this configuration, the air can flow inside the ventilation passage easily, and thus heat can be dissipated more efficiently.

Furthermore, in the connection module disclosed in the present specification, the connection member may also be a long connection member that passes over the plurality of the power storage elements of the power storage element group. Here, the above-mentioned Equation 1 becomes the following Equation 2:

$$Q = 1 \times (\rho l/A) \times t \quad \text{(Equation 2)}$$

where the electrical resistivity is denoted as $\rho$, the cross-sectional area is denoted as A, and the length is denoted as l, and the amount of generated heat Q increases as the connection member becomes longer. With this configuration, the technology disclosed in the present specification can be particularly applied effectively.

According to the technology described in the present specification, it is possible to provide a connection module capable of effectively dissipating internal heat with a simple structure.

BRIEF DESCRIPTION OF DRAWINGS

FIG. 9 is a cross sectional view taken along line B-B in FIG. 1.

DESCRIPTION OF EMBODIMENTS

Embodiment

Hereinafter, a power storage module M1 to which a connection module 1 according to one embodiment is attached will be described with reference to FIGS. 1 to 9.

The power storage module M1 is used in a posture with the upper side in FIGS. 1 to 5 and 8 as the upper side U (the lower side as down). In the following description, front F refers to the front side, (back refers to the back side), and left L refers the left side (right refers to the right side), of the paper planes in FIGS. 1 to 4.

Figure 1:
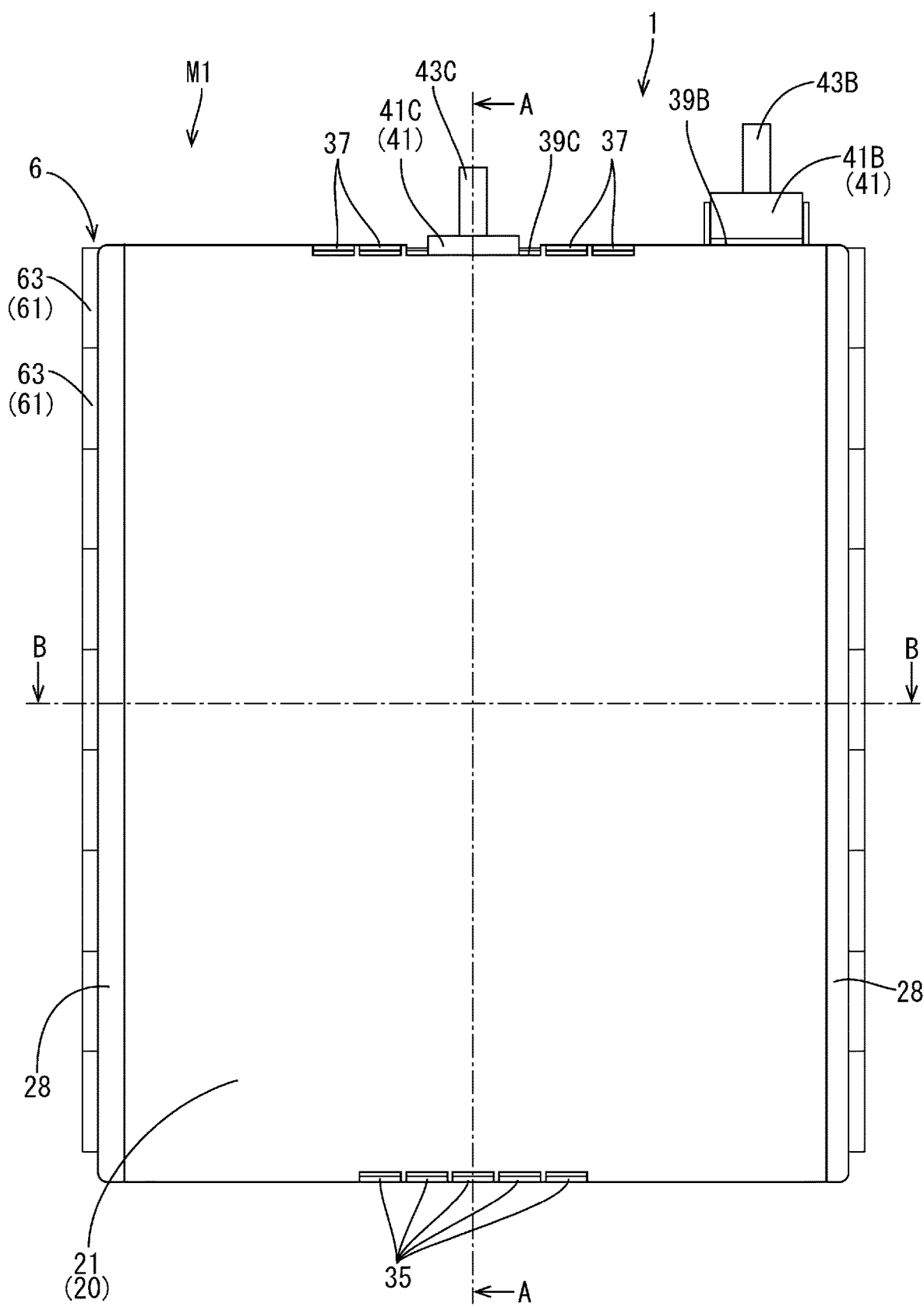
FIG. 1 is a front view of a power storage module to which a connection module according to one embodiment is attached.

The power storage module M1 shown in FIG. 1 is mounted on a vehicle such as an electric vehicle or a hybrid vehicle (not shown) and used as a power source for driving the vehicle. As shown in FIGS. 1 and 6 to 9, the power storage module M1 as a whole is constituted of a power storage element group 6 formed by stacking a plurality of power storage elements 61 in the vertical direction (see FIG. 2), and a connection module 1 attached to a front side of the power storage element group 6.

Figure 2:
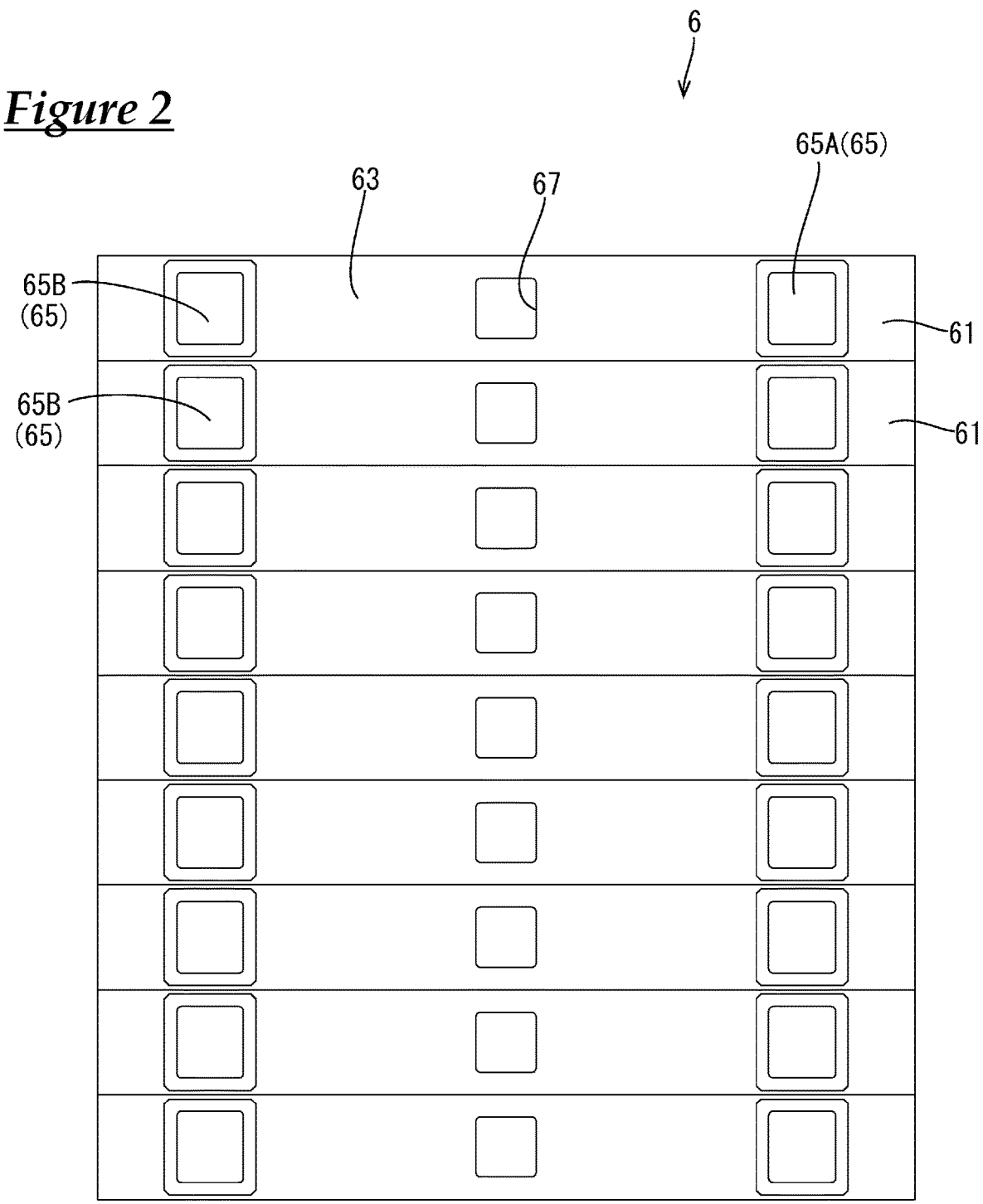
FIG. 2 is a front view of a power storage element group.

As shown in FIG. 2, the power storage elements group 6 is constituted by stacking a plurality (in this embodiment, nine) of the power storage elements 61 in a column in the vertical direction.

As shown in e.g. FIG. 2, the power storage elements 61 of this embodiment may be secondary batteries, for example. Alternatively, capacitors may be used as the power storage elements 61, for example.

The power storage elements 61 have outer shapes that are flat rectangular parallelepipeds, and each has one electrode arrangement surface 63. A pair of electrode terminals 65 is formed at positions near the left and right end portions of the electrode arrangement surface 63. One of the electrode terminals 65 is a positive terminal 65A and the other is a negative terminal 65B. The electrode terminals 65 are made of metal, and protrude forward from the electrode arrangement surface 63 in square cylindrical shapes.

Figure 8:
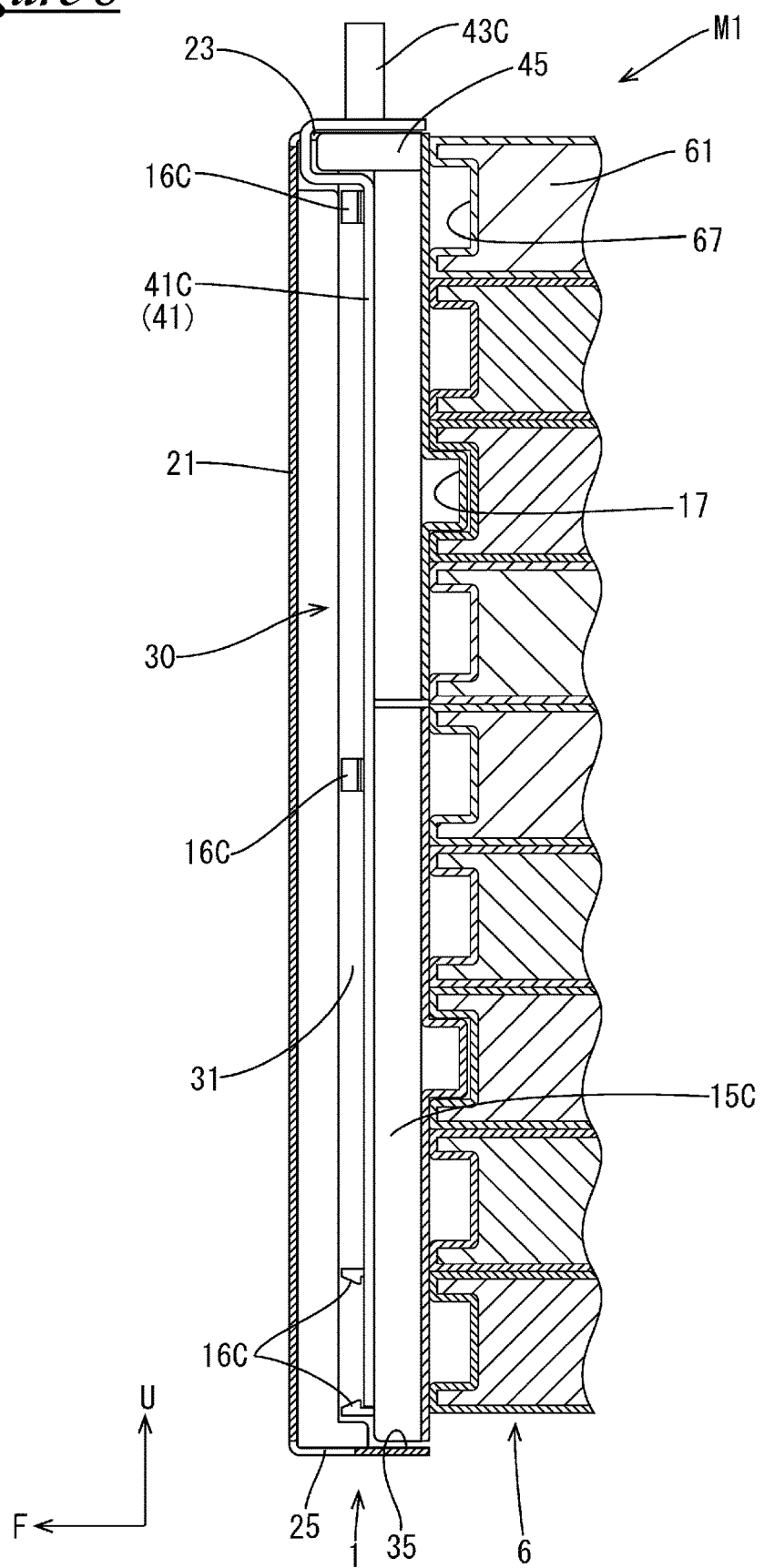
FIG. 8 is a cross sectional view taken along line A-A in FIG. 1.

A positioning recess 67 for being fitted to a later-described positioning portion 17 of a protector unit 11 is provided in the middle between the two electrode terminals 65 on the electrode arrangement surface 63 of each power storage element 61. The positioning recess 67 has a rectangular opening and has a concave shape that is recessed from the electrode arrangement surface 63, as shown in FIG. 8, for example.

The plurality of power storage elements 61 are stacked in a column in the vertical direction such that the electrode arrangement surfaces 63 are arranged on one vertical surface, and electrode terminals 65 with different polarities are adjacent to each other in any two vertically adjacent power storage elements 61 (in other words, the negative terminal 65B of one power storage element 61 is arranged above or below the positive terminal 65A of the neighboring power storage element(s) 61). The plurality of power storage elements 61 are fixed with a not-shown fixing member.

As shown in e.g. FIG. 1, the connection module 1 according to this embodiment is attached to a vertical surface (front side) constituted by the electrode arrangement surfaces 63 of the power storage elements 61 of the power storage element group 6. The connection module 1 is provided with a plurality of bus bars 41 (an example of the connection member) that are connected to the electrode terminals 65, an insulating protector 10 that has holding portions 13 for holding the bus bars 41, and a cover 20 that is attached to the insulating protector 10 so as to cover the holding portions 13.

Figure 4:
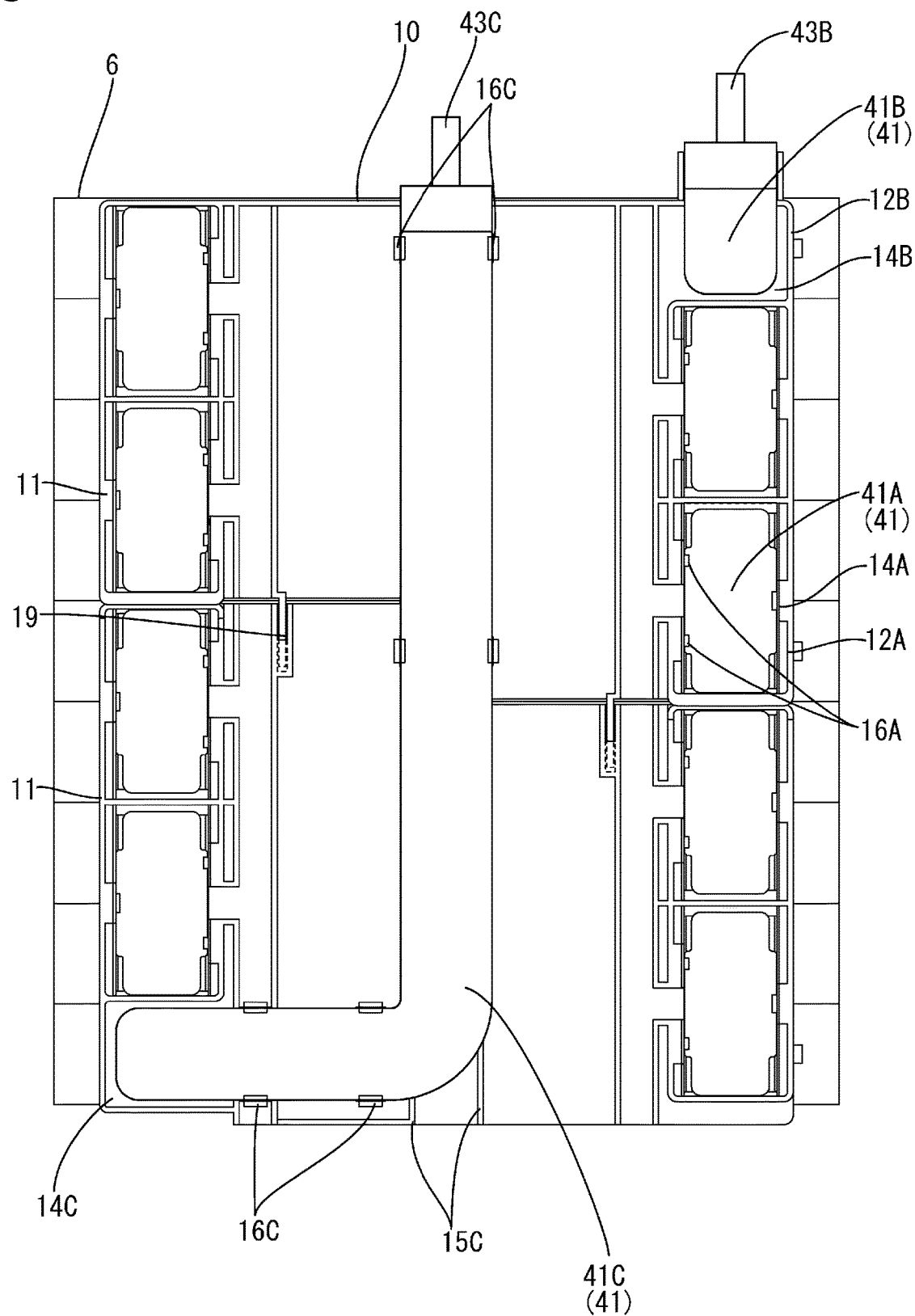
FIG. 4 is a front view showing how bus bars are attached to the configuration in FIG. 3.

The bus bars 41 as shown in e.g. FIG. 4 can be formed by, for example, punching a metal plate. Examples of the material of the metal plate include copper, copper alloys, aluminum, aluminum alloys, and stainless steel (SUS). As shown in FIG. 4, in this embodiment, a total of three kinds of bus bars 41 are used, namely a plurality of connection bus bars 41A, and as well as a short bus bar 41B and a long bus bar 41C, which together constitute a pair of output bus bars.

The connection bus bars 41A are for connecting the positive terminals 65A and the negative terminals 65B that are vertically adjacent to each other on the front side of the power storage element group 6. The connection bus bars 41A are approximately flat rectangular plates as a whole, and held by an insulating protector 10 in a posture with the length direction as the vertical direction.

The pair of output bus bars are for electrically connecting the power storage module M1 and other electrical devices. The short bus bar 41B is approximately rectangular as a whole, and is held by the insulating protector 10 in a posture with the length direction as the vertical direction. The long bus bar 41C is approximately L-shaped overall, with a short flat-plate portion and a long portion being coupled at a right angle, and is held by the insulating protector 10 in a posture in which the long portion extends upward from the coupling portion. The long bus bar 41C is a long connection member whose long portion passes over the plurality of power storage elements 61. As shown in FIG. 8, the upper ends of the short bus bar 41B and the long bus bar 41C are bent such that their cross sections approximately form U-shapes opening to the rear, clamping a reinforcing resin member 45 having a flat box shape. An external connection terminal 43B and an external connection terminal 43C that are connectable to the other electrical devices protrude from the upper sides of the short bus bar 41B and the long bus bar 41C.

Figure 3:
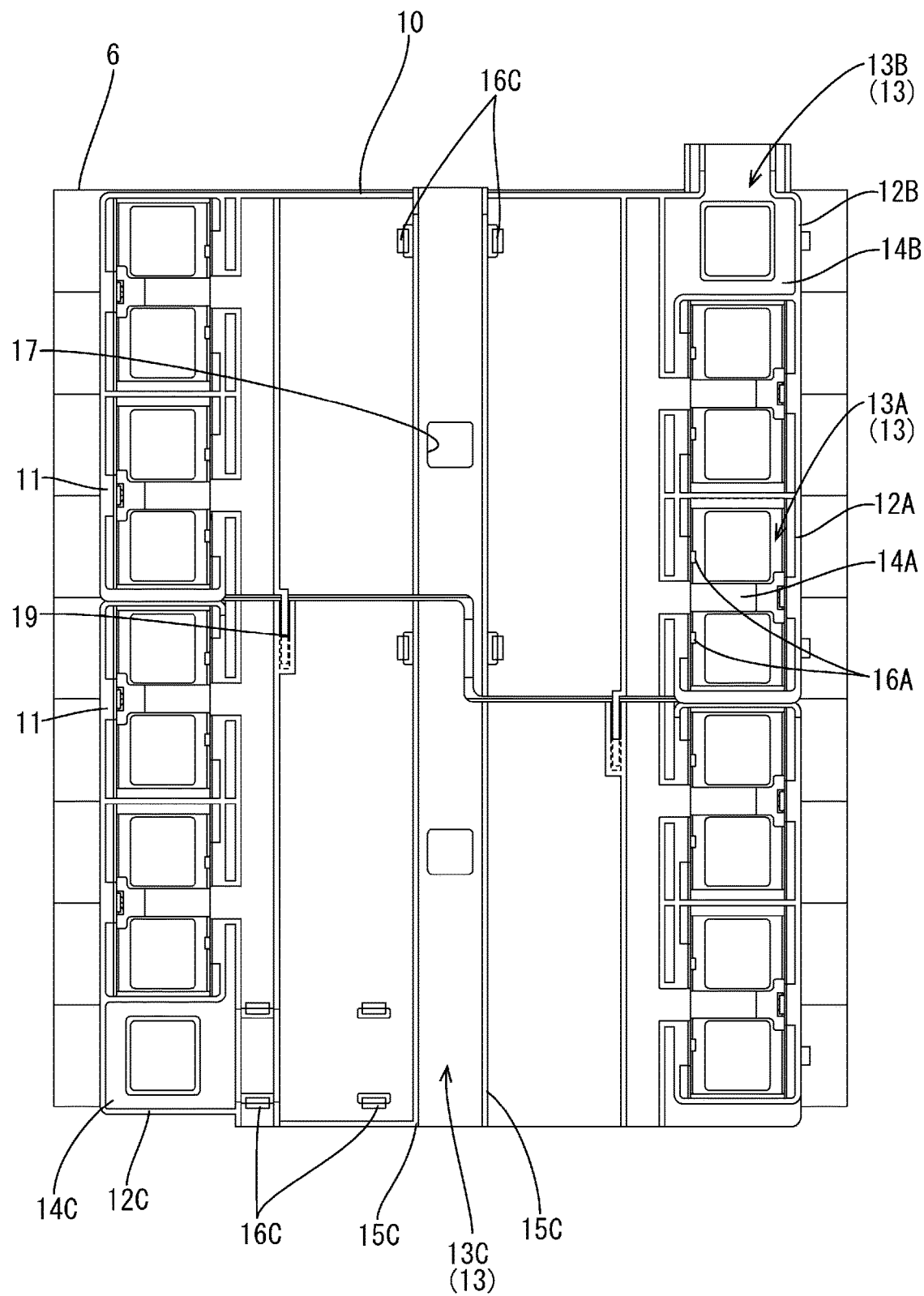
FIG. 3 is a front view showing how an insulating protector is attached to the configuration in FIG. 2.

As shown in e.g. FIG. 3, the insulating protector 10 of this embodiment is constituted by two protector units 11 made of an insulating material such as a synthetic resin. The two protector units 11 are coupled together and fixed to each other with an engagement structure provided in a coupling portion 19. Positioning portions 17 protrude backward in the middle of the protector units 11. As shown in FIG. 8, the two protector units 11 are lined up vertically and attached to the front side of the power storage element group 6, while the positioning portions 17 are fitted into positioning recesses 67 of the power storage elements 61.

Holding portions 13 that hold bus bars 41 are formed on the front side of the protector units 11. As shown in FIGS. 3 and 4, in this embodiment, three types of holding portions 13 are formed for the above-described bus bars 41, namely a plurality of connection bus bar holding portions 13A for accommodating and holding the connection bus bars 41A, a short bus bar holding portion 13B for accommodating and holding the short bus bar 41B, and a long bus bar holding portion 13C for holding the long bus bar 41C.

The connection bus bar holding portions 13A are formed by vertically lining up the plurality (in this embodiment, four each in the left and right column) of the connection bus bar holding portions 13A on the front side of the insulating protector 10 so as to extend in the vertical direction along the left and right end portions. The connection bus bar holding portions 13A each have a containing wall 12A protruding forward in a rectangular cylindrical shape. In a state where the insulating protector 10 is attached to the front side of the power storage element group 6, the containing wall 12A surrounds two vertically adjacent electrode terminals 65 together. The back surface of each connection bus bar holding portion 13A has openings at positions corresponding to the electrode terminals 65, and a holding surface 14A spans the openings. As shown in FIG. 9, the holding surface 14A is formed frontward of the surface in the middle of the protector unit 11. Furthermore, a pair of flexibly deformable upper and lower connection bus bar holding claws 16A is formed on the inner surface of the containing wall 12A.

The short bus bar holding portion 13B is formed in the top right corner portion of the front side of the insulating protector 10. The short bus bar holding portion 13B has a containing wall 12B protruding forward. The containing wall 12B surrounds the electrode terminal 65 that is located at the top of the right column and opens upward in a state where the insulating protector 10 is attached to the power storage element group 6. In addition, the back surface of the short bus bar holding portion 13B has an opening in a position corresponding to the electrode terminal 65, and the holding surface 14B is formed on a peripheral edge of this opening.

The long bus bar holding portion 13C is approximately L-shaped, covering the area including the bottom left corner portion and the portion along the horizontal center line, on the front side of the insulating protector 10. The long bus bar holding portion 13C includes a containing wall 12C protruding forward. In a state where the insulating protector 10 is attached to the power storage element group 6, the containing wall 12C surrounds the electrode terminal 65 that is located at the bottom of the left column. The back surface of the long bus bar holding portion 13C has an opening at a position corresponding to this electrode terminal 65, and the holding surface 14C is formed on a peripheral edge of the opening. In addition, the long bus bar holding portion 13C has holding walls 15C that protrude forward and extend along the horizontal center line. As shown in FIG. 9, the holding walls 15C are formed such that this front side and the above-described holding surfaces 14A, 14B, and 14C are arranged on the same plane. Furthermore, two pairs of long bus bar holding claws 16C are vertically lined up and erected along the left and right holding walls 15C, protruding forward from the holding walls 15C. The two pairs of long bus bar holding claws 16C are horizontally lined up and erected also in the intermediate position between the containing wall 12C and the holding walls 15C.

The cover 20 as shown in FIGS. 1 and 6 to 9 is made of a synthetic resin, and includes a front wall portion 21 formed in an approximately rectangular plate shape that is a little larger than the front side of the insulating protector 10. An upper wall portion 23, a lower wall portion 25, a left wall portion 27, and a right wall portion 29 extend backward from the four edges of the front wall portion 21. The front end portions of the left wall portion 27 and the right wall portion 29 are bent outward to form flange portions 28.

Figure 6:
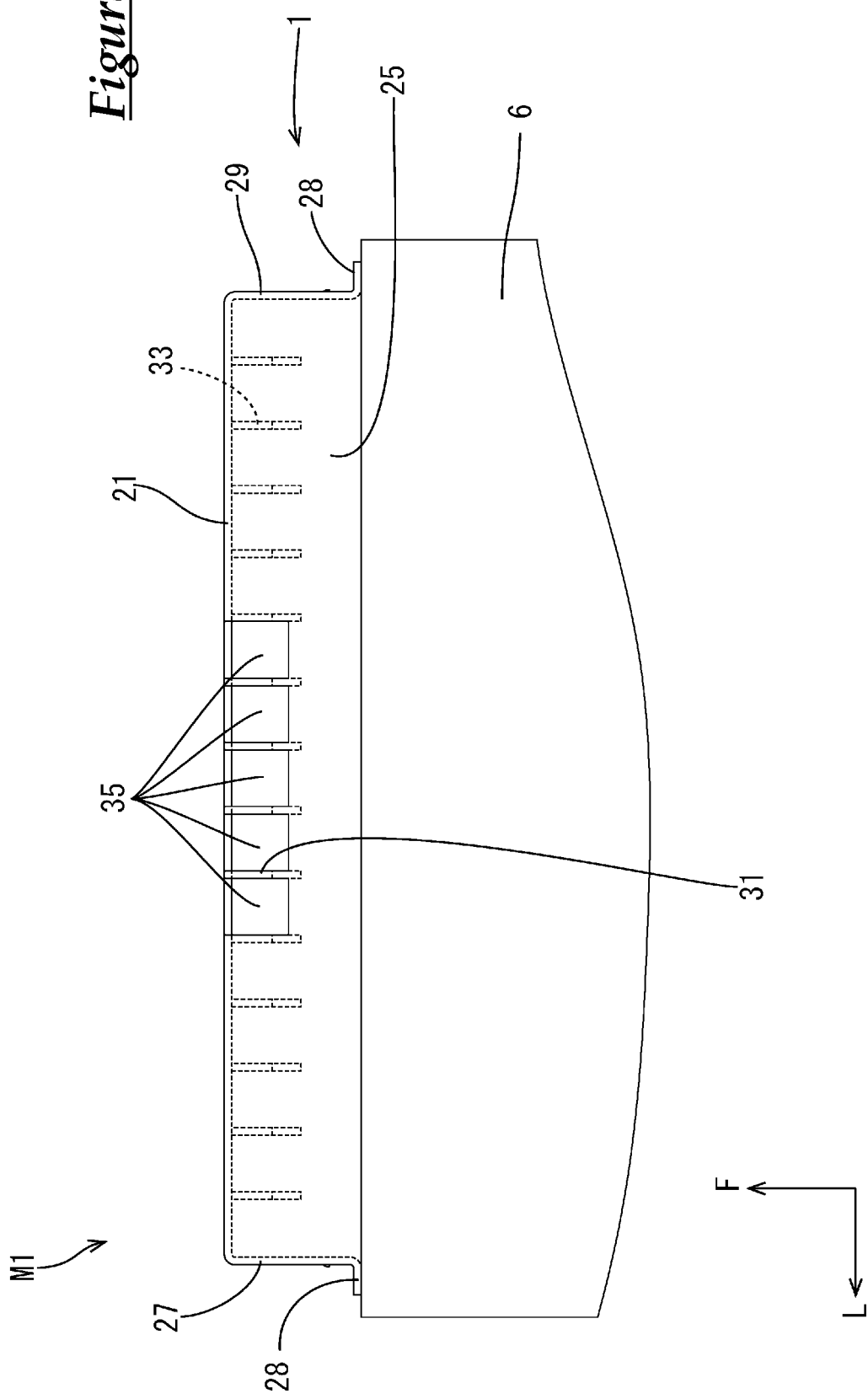
FIG. 6 is a partial bottom view of FIG. 1.
Figure 7:
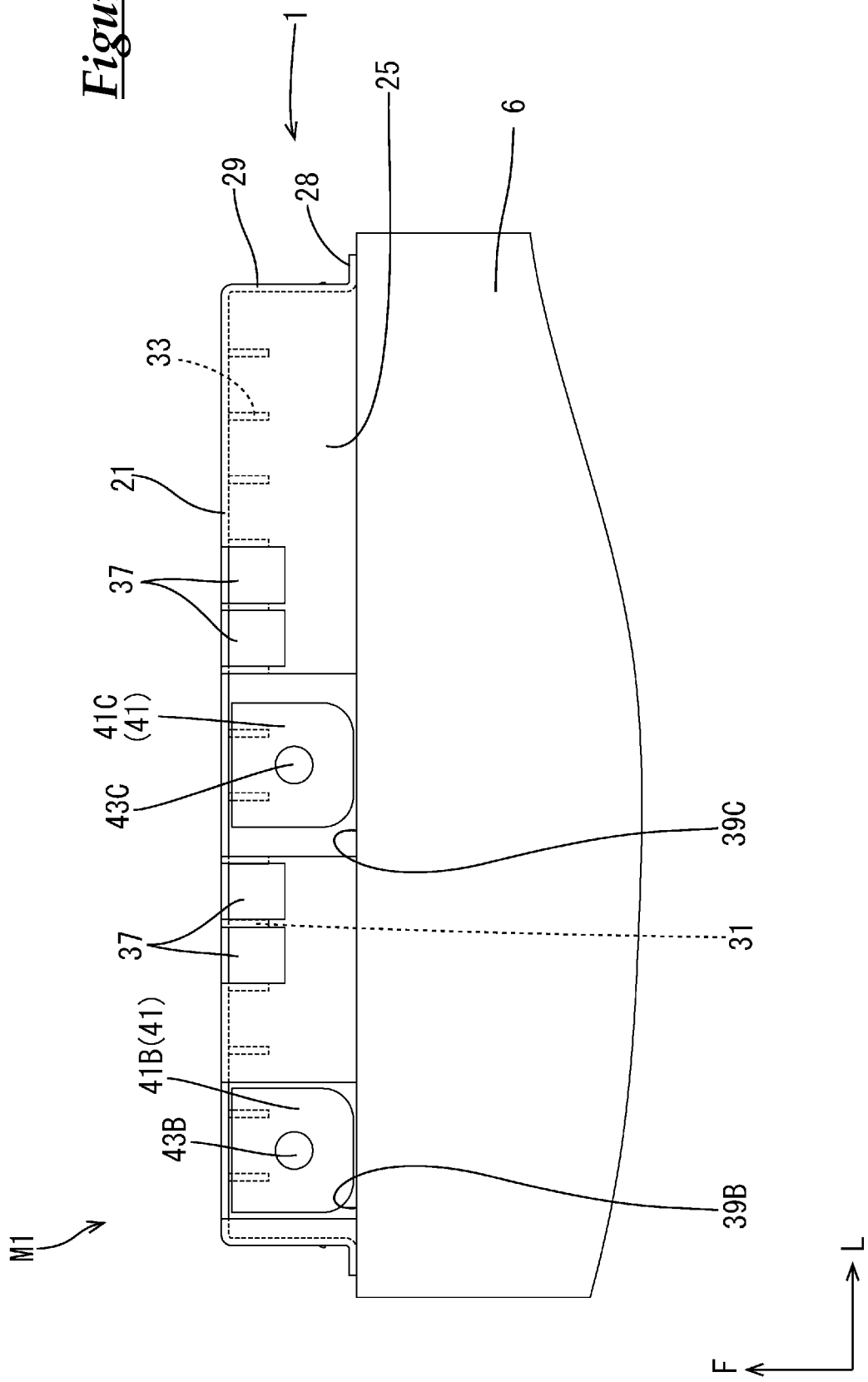
FIG. 7 is a partial top view of FIG. 1.

Now, as shown in FIG. 6, five intake ports 35 are formed in a row in the middle of the lower wall portion 25 of the cover 20 such that air from the outside can flow into the connection module 1 through these intake ports 35. On the other hand, as shown in FIG. 7, an external connection opening 39C and an external connection opening 39B are formed in the middle and the right end portion of the upper wall portion 23, respectively, and a total of four exhaust ports 37 are formed, namely two each on the left and right side of the external connection opening 39C. The air inside the connection module 1 can flow out through these exhaust ports 37.

Figure 5:
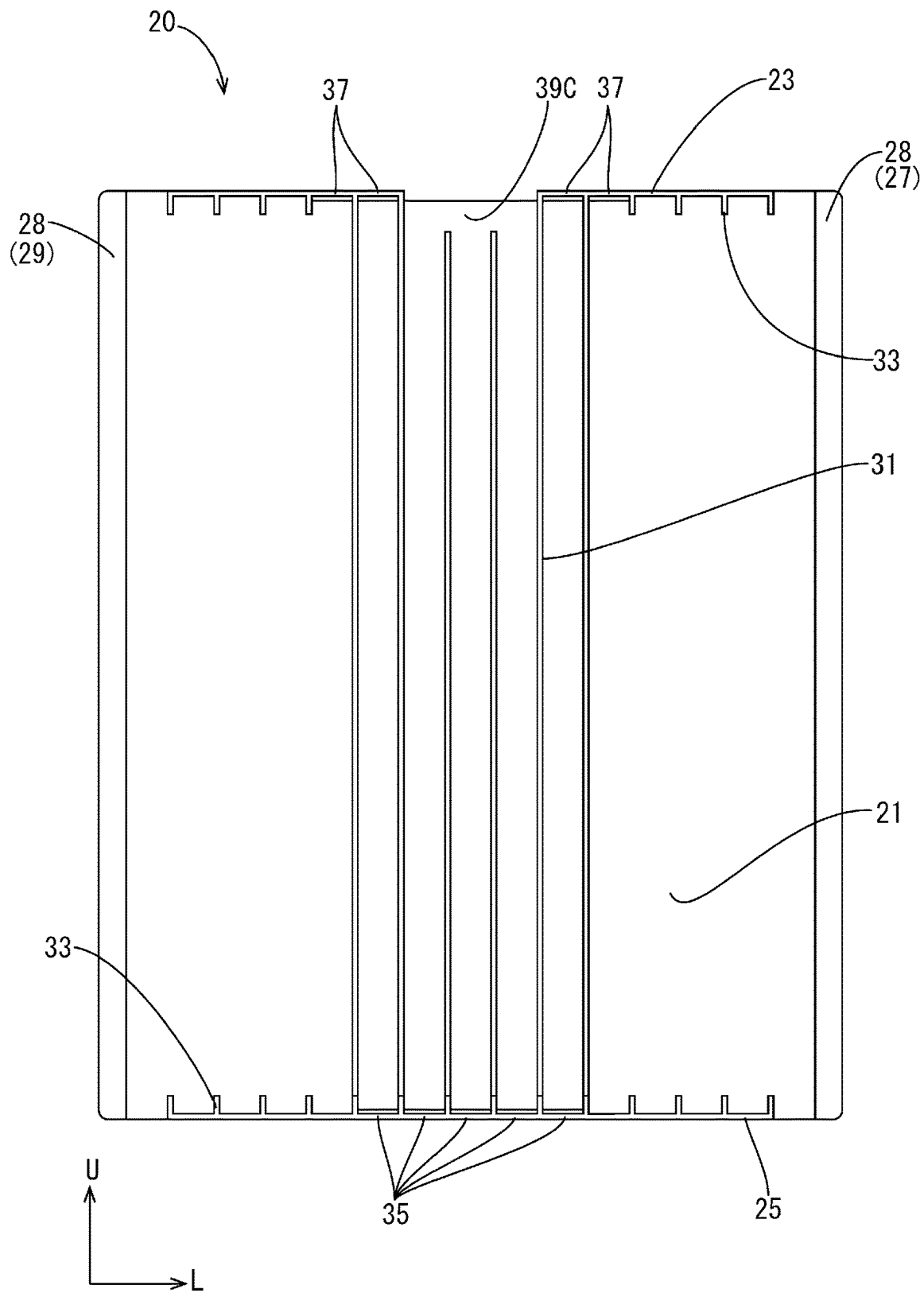
FIG. 5 is a back view of a cover.

FIG. 5 is a back view of the cover 20 viewed from the rear side. As shown in FIG. 5, reinforcing ribs 33 for reinforcement are formed at regular intervals on the inner surfaces of the upper wall portion 23 and the lower wall portion 25, continuous with the inner surface of the front wall portion 21. Furthermore, six ribs 31 protrude from the middle of the inner surface of the front wall portion 21, extending from the upper end portion to the lower end portion. The above-described intake ports 35 are formed between the portions where the six ribs are linked to the lower wall portion 25. Furthermore, the above-described external connection opening 39C is formed at a position between the left and right ribs 31, which are, respectively, the second from the center in the upper wall portion 23, and the above-described exhaust ports 37 are formed on the two sides of the portion to which the ribs 31 located on the two ends are connected.

Method for Assembling Power Storage Module M1

Next, an example of a method for assembling the power storage module M1 of this embodiment will be described. Note that the method for assembling the power storage module M1 is not limited to the following.

When the power storage module M1 of this embodiment is assembled, the power storage element group 6 is formed in advance by vertically stacking and fixing the plurality of the power storage elements 61 such that the electrode arrangement surfaces 63 are arranged on a single vertical surface (see FIG. 2).

First, the two protector units 11 are coupled to each other at the coupling portion 19, and the insulating protector 10 is formed. Then, this insulating protector 10 is attached to the front side (vertical surface formed of the electrode arrangement surfaces 63 of the power storage elements 61) of the power storage element group 6 (FIG. 3). When the positioning portions 17 of the protector units 11 are fitted into the positioning recesses 67 of the power storage elements 61 from the front, the containing walls 12A each surround a pair of vertically adjacent electrode terminals 65. Furthermore, the containing wall 12B surrounds the electrode terminal 65 that is located on the top of the right column, and the containing wall 12C surrounds the electrode terminal 65 that is located at the bottom of the left column.

Next, the bus bars 41 are held by the holding portions 13 of the insulating protector 10 (FIG. 4). The connection bus bars 41A are inserted into the connection bus bar holding portions 13A from the front such that their peripheral edges extend along the containing walls 12A, pushed behind the connection bus bar holding claws 13A with the connection bus bar holding claws 16A being elastically deformed, and retained from the front. By doing this, the connection bus bars 41A are accommodated and held in the containing walls 12A in a state where their two end portions abut against vertically adjacent electrode terminals 65 that are exposed from the insulating protector 10.

The short bus bar 41B is inserted into the short bus bar holding portion 13B from the front such that its bottom edge extends along the containing wall 12B. Thus, the short bus bar 41B is accommodated and held in the containing wall 12B in a state where one end portion of the short bus bar 41B abuts against the electrode terminal 65 that is located on the top of the right column and is exposed from the insulating protector 10, and the external connection terminal 43B protrudes upward.

The long bus bar 41C is inserted into the long bus bar holding portion 13C from the front such that its short portion extends along the containing wall 12C. Then, the long bus bar 41C is pushed between the pair of long bus bar holding claws 16C with the connection bus bar holding claws 16C being elastically deformed, and retained from the front. By doing this, the long bus bar 41C is held in the containing wall 12C and on the front side of the holding walls 15C in a state where one end portion of the long bus bar 41C abuts against the electrode terminal 65 that is located at the bottom of the left column and is exposed from the insulating protector 10, and the external connection terminal 43C protrudes upward.

Next, the bus bars 41 and the electrode terminals 65 are welded together through laser welding. Predetermined positions of bus bars 41 are irradiated with laser light from the front with a not-shown laser irradiation apparatus, and thus, the power storage elements 61 are connected to each other in series via the connection bus bars 41A between the external connection terminal 43B and the external connection terminal 43C.

Next, the cover 20 is attached from the front of the insulating protector 10 to which the bus bars 41 are connected and held (e.g. FIG. 1). As shown in FIGS. 6 to 9, the cover 20 is wrapped around and attached to the insulating protector 10 that is attached to the front side of the power storage element group 6, in a state where the flange portions 28 come into contact with the front side of the power storage element group 6. The cover 20 is fixed to the insulating protector 10 with a known lock structure which is not shown.

As shown in FIG. 1, when the cover 20 is attached, the external connection terminal 43C of the long bus bar 41C protrudes above the cover 20 from the external connection opening 39C formed in the upper wall portion 23 of the cover 20, and the external connection terminal 43B of the short bus bar 41B protrudes above the cover 20 from the external connection opening 39B formed in the upper wall portion 23 of the cover 20. Then, as shown in FIG. 9, the ribs 31 formed on the inner surface of the front wall portion 21 are fixed on the front side of the long portion of the long bus bar 41C that is held on the front side of the holding wall 15C, while leaving some space. In this way, a space formed between the inner surface of the front wall portion 21 of the cover 20 and the insulating protector 10 is in communication with the intake ports 35 provided in the lower wall portion 25 of the cover 20 and the exhaust ports 37 provided in the upper wall portion 23 of the cover 20, and constitutes a ventilation passage 30.

Actions and Effects

Next, the actions and effects of this embodiment will be described below. When the power storage module M1 constituted as above is in operation, a large current flows in the bus bars 41, and thus the bus bars 41 generate a large amount of heat. For this reason, with the conventional structure, there is a risk that the temperature inside the connection module 1 will be high.

In view of this, in the connection module 1 of this embodiment, the intake ports 35 are formed in the lower wall portion 25 of the cover 20 that forms the bottom surface of the connection module 1, and the exhaust ports 37 are formed in the upper wall portion 23 of the cover 20 that forms the top surface of the connection module 1, and the ventilation passage 30 is formed in communication with these ports such that air can flow in vertical direction. Then, among the bus bars 41 that generate heat, the long portion of the long bus bar 41C (long connection member) that generates a particularly large amount of heat is arranged inside this ventilation passage 30. For this reason, heat which is likely to be accumulated inside the connection module 1 can be efficiently dissipated due to the chimney effect. To describe this in more detail, the air which flows into the connection module 1 from the intake ports 35 provided in the lower wall portion 25 of the cover 20 is warmed by coming into contact with the long bus bar 41C arranged inside the ventilation passage 30. The warmed air whose density is reduced becomes lighter and goes up inside the ventilation passage 30, and flows out from the exhaust ports 37 provided in the upper wall portion 23. As a result, it is possible to dissipate heat generated by the long bus bar 41C to the outside of the connection module 1 efficiently. Furthermore, negative pressure is generated inside the ventilation passage 30 due to upward convection of the warmed air, and thus the outside air easily flows into the connection module 1 from the intake ports 35, and cooling efficiency is further increased. In this way, with a very simple configuration in which the intake ports 35 and the exhaust ports 37 are provided in the cover 20, it is possible to obtain a connection module 1 that is capable of effectively dissipating heat inside without an increase of the manufacturing cost and man-hours.

Furthermore, with the connection module 1 of this embodiment, the long bus bar 41C is held on the front side of the holding walls 15C provided in the long bus bar holding portion 13C, and thus the air can flow vertically between the holding walls 15C as well. In other words, the air inside the ventilation passage 30 is capable of coming into contact with the two sides, namely the front and back sides of the long bus bar holding portion 13C, and thus cooling can be performed efficiently.

Furthermore, in the connection module 1 of this embodiment, the middle portion of the cover 20, namely the part where the ventilation passage 30 is formed, is provided with a plurality of ribs 31 that protrude toward the long bus bar 41C that is held by the insulating protector 10 and extend in the vertical direction. With the ribs 31, the rigidity of the cover 20 is increased and thus the strength is improved, and also the air flow inside the ventilation passage 30 is straightened due to the ribs 31 that protrude into the ventilation passage 30 and function as straightening plates. As a result, the flowability of the air flowing on the front side of the long bus bar 41C is improved, and thus heat can be dissipated more efficiently. Note that the air flowing on the back side of the long bus bar 41C can flow smoothly between the two holding walls 15C extending in the vertical direction.

In the connection module 1 of this embodiment, the ventilation passage 30 is linearly formed along the vertical direction. Accordingly, the air in the ventilation passage 30 flows extremely easily, and thus heat can be efficiently dissipated.

The connection module 1 of this embodiment is provided with a plurality of the intake ports 35 and exhaust ports 37. In other words, while a sufficient air flow amount is ensured by providing the plurality of intake ports 35 and exhaust ports 37, the area of the individual intake ports 35 and exhaust ports 37 is reduced so that the fingertips of the worker do not enter them during maintenance or the like, and therefore the risk of electrical shock, for example, is suppressed. Accordingly, the present design is also excellent in work safety.

Other Embodiments

The technology disclosed in the present specification is not limited to the embodiments described through the above description and drawings, and for example, the following embodiments are also encompassed within the technical scope.

In the above embodiment, the ventilation passage 30 may also be provided in the part where the connection bus bars 41A and the short bus bar 41B are arranged, and may also be provided at multiple positions in the connection module 1. The intake ports 35 may be provided in the right end portion and/or the left end portion of the lower wall portion 25 of the cover 20, the exhaust ports 37 may be provided in the right end portion and/or the left end portion of the upper wall portion 23 of the cover 20, and e.g. a plurality of the connection bus bars 41A and/or the short bus bar 41B may be arranged inside the ventilation passage 30, for example.

In the above embodiment, the intake ports 35 are provided in the lower wall portion 25 of the cover 20, and the exhaust ports 37 are provided in the upper wall portion 23 of the cover 20, but the present invention is not limited thereto. The intake ports 35 and the exhaust ports 37 may be arranged at any positions as long as the exhaust ports 37 are formed above the intake ports 35, and it is possible to decide the arrangement in consideration of the installation environment, for example. If the usage is envisioned for an environment where dripping water is a concern, for example, intrusion of water into the connection module 1 can be suppressed by forming the exhaust ports 37 in the front wall portion 21, the left wall portion 27, or the right wall portion 29. Furthermore, in order to ensure work safely, it is also possible to provide slit-shaped holes as the intake ports 35 and the exhaust ports 37, each having a width into which the fingertips of the worker cannot be inserted (for example, not more than 1 cm), instead of providing a plurality of small-area holes.

There is no limitation to how the cover 20 is arranged. The cover 20, for example, may be slidingly engaged to the insulating protector 10 from above or below, and a configuration is also possible in which the cover 20 is provided in the insulating protector 10 in a single piece with, e.g. a hinge mechanism. Furthermore, a configuration is also possible, in which the connection module 1 is not provided with the insulating protector 10 and the cover 20 is directly attached to the power storage element group 6, for example.

The ribs 31 are not limited to being formed on the cover 20 in a single piece, and it is also possible to attach them as separately formed parts to the cover 20 afterwards through a means such as fitting or adhering.

The bus bars 41 are not limited to being connected through welding, and it is also possible to connect the bus bars 41 to the electrode terminals 65 through fastening them together with bolts and nuts, for example.

The direction in which the power storage elements 61 of the power storage element group 6 are lined up is not limited to the vertical direction, and it is possible to line up the power storage elements 61 in any direction such as the horizontal direction.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

M1 Power storage module
1 Connection module
6 Power storage element group
10 Insulating protector
13A Connection bus bar holding portion (holding portion)
13B Short bus bar holding portion (holding portion)
13C Long bus bar holding portion (holding portion)
20 Cover portion
23 Upper wall portion
25 Lower wall portion
30 Ventilation passage
31 Rib
35 Intake port
37 Exhaust port
41A Connection bus bar (connection member)
41B Short bus bar (connection member)
41C Long bus bar (long connection member)
61 Power storage element
63 Electrode arrangement surface
65A Positive terminal (electrode terminal)
65B Negative terminal (electrode terminal)

The invention claimed is:
1. A connection module that is attachable to a power storage element group formed by lining up a plurality of power storage elements that each have a positive and a negative electrode terminal, the connection module comprising:
- a connection member that extends in a vertical direction and is connected to one of the electrode terminals; and
- a cover that covers the connection member, the cover being attached to the power storage element group,
- wherein the cover has an intake port and an exhaust port that is provided at a position above a position of the intake port, and
- a ventilation passage through which air can flow in the vertical direction and that is formed between the cover and the power storage element group, the ventilation passage being in communication with the intake port and the exhaust port, and the connection member being arranged inside the ventilation passage, wherein the ventilation passage is formed in the cover, and the ventilation passage is provided with a rib that protrudes toward the connection member and that extends vertically from the intake port side to the exhaust port side.

2. The connection module according to claim 1,
wherein the ventilation passage is formed along the vertical direction.

3. The connection module according to claim 1,
wherein the connection member is a long connection member that passes over the plurality of the power storage elements of the power storage element group.

\* \* \* \* \*